United States Patent
Bollay et al.

(10) Patent No.: US 9,246,880 B2
(45) Date of Patent: Jan. 26, 2016

(54) METHODS FOR SECURE COMMUNICATION BETWEEN NETWORK DEVICE SERVICES AND DEVICES THEREOF

(71) Applicant: F5 Networks, Inc., Seattle, WA (US)

(72) Inventors: Benn Bollay, Seattle, WA (US); Peter M. Thornewell, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 13/768,159

(22) Filed: Feb. 15, 2013

(65) Prior Publication Data

US 2013/0290699 A1    Oct. 31, 2013

Related U.S. Application Data

(60) Provisional application No. 61/599,784, filed on Feb. 16, 2012.

(51) Int. Cl.
    *G06F 21/42* (2013.01)
    *H04L 29/06* (2006.01)
    *H04L 12/951* (2013.01)

(52) U.S. Cl.
    CPC .............. *H04L 63/04* (2013.01); *H04L 63/029* (2013.01); *H04L 63/166* (2013.01)

(58) Field of Classification Search
    CPC ............ G06F 2211/003; G06F 9/4411; H04L 63/0236; H04L 63/0876; H04L 63/1466; H04L 63/205; H04L 65/1069; H04W 60/00; H04W 88/02; H04H 60/31; H04H 60/66
    See application file for complete search history.

(56) References Cited

U.S. PATENT DOCUMENTS

| | | | |
|---|---|---|---|
| 7,206,932 B1 | 4/2007 | Kirchhoff | |
| 2012/0255022 A1* | 10/2012 | Ocepek et al. | 726/25 |
| 2013/0198511 A1* | 8/2013 | Yoo et al. | 713/156 |

OTHER PUBLICATIONS

Inside SSL: Accelerating Secure Transactions. Chou, Wesley. IEEE(2002).*
Blake-Wilson et al., "Transport Layer Security (TLS) Extensions," (Apr. 2006).
Tridgell et al., "Rsync," retrieved from http://en.wilipedia.org/wiki/Rsync, 7 pages (Jan. 27, 2012).
F5 Networks, "Big-IP® Local Traffic ManagerTM: Concept," Version 11.1, retrieved from Internet: URL:http//support.f5.com/content/kb/en-us/products/big-ip_ltm/manuals/product/ltm-concepts-11-1-0/_jcr_content/pdfAttach/download/file.res/ltm-concepts-11-1-0.pdf retrieved on Apr. 3, 2013] Sections 1, 2, 5, and 11 (Nov. 10, 2011).
Eastlake, 3rd Huawei D, "Transport Layer Security (TLS) Extensions: Extension Definitions," RFC:6066 pp. 1-25 (Jan. 18, 2011).
International Search Report and Written Opinion for International Patent Application No. PCT/US2013/026262 (May 17, 2013).

* cited by examiner

*Primary Examiner* — Venkat Perungavoor
(74) *Attorney, Agent, or Firm* — LeClairRyan, a Professional Corporation

(57) ABSTRACT

A method, non-transitory computer readable medium, and network device that generates a network communication including a destination address associated with a second network device and a destination port number, wherein the destination port number corresponds to a service operating on the second network device. An initial SSL handshake protocol message is generated and at least the destination port number is inserted into a server name indicator (SNI) extension of the initial SSL handshake protocol message. An SSL connection is established with the second network device using a predetermined port number and the initial SSL handshake protocol message is sent to the second network device. Information included in the network communication is sent to the second network device using the SSL connection.

15 Claims, 4 Drawing Sheets

METHODS FOR SECURE COMMUNICATION BETWEEN NETWORK DEVICE SERVICES AND DEVICES THEREOF

This application claims the benefit of U.S. Provisional Patent Application Ser. No. 61/599,784, filed on Feb. 16, 2012, which is hereby incorporated by reference in its entirety.

FIELD

This technology generally relates to network devices and, more particularly, to methods, non-transitory computer readable medium, and devices for facilitating secure communication between network device services.

BACKGROUND

Network traffic can be optimized, managed, and/or distributed by one or more network traffic management apparatus. Many networks include a plurality of network traffic management apparatus, such as associated with one or more local area networks (LANs) and/or one or more server pools, for example. Additional advantages can be obtained by communicating network traffic between network traffic management apparatus, such as client-side and server-side network traffic management apparatus symmetrically disposed on either side of a wide area network (WAN), for example. In one such deployment, at least one network traffic management apparatus is disposed on a client side of a WAN as associated with a LAN connecting many client computing devices 16(1)-16(*n*). Additionally, another network traffic management apparatus is disposed on a server side of a WAN as associated with one or more server pools.

In order to manage network traffic in this exemplary deployment, it is advantageous for one or more of the network traffic management apparatus to communicate other information, such as configuration information, to one or more other network traffic management apparatus. Accordingly, a process, thread, application, daemon (e.g. rsync daemon), or service (collectively referred to herein as a "service") operating on a first network traffic management apparatus, may want to communicate information, such as synchronization data, to a service operating on a second network traffic management apparatus. The service operating on the second network traffic management apparatus can be identified by and associated with a port number. Additionally, it is generally desirable that such communications are secure and that the various network traffic management apparatus are authenticated.

However, many networks employing network traffic management apparatus have a limited quantity of port numbers, often arbitrated by a firewall provided by one or more network devices. As a result, such networks may only make one port number available to a network traffic management apparatus and may use a firewall to restrict network communications identifying a different port number not allocated to the network traffic management apparatus. Accordingly, network communications originating from a first network traffic management apparatus and identifying a service on a second network traffic management apparatus by a destination port number may be filtered prior to reaching the intended destination service operating on the second network traffic management apparatus, which is undesirable.

SUMMARY

A method for secure communication between network device services includes generating at a first network device a network communication including a destination address associated with a second network device and a destination port number, wherein the destination port number corresponds to a service operating on the second network device. An initial SSL handshake protocol message is generated with the first network device and at least the destination port number is inserted by the first network device into a server name indicator (SNI) extension of the initial SSL handshake protocol message. An SSL connection is established by the first network device with the second network device using a predetermined port number and the initial SSL handshake protocol message is sent by the first network device to the second network device. Information included in the network communication is sent by the first network device to the second network device using the SSL connection.

A non-transitory computer readable medium having stored thereon instructions for secure communication between network device services comprising machine executable code which when executed by at least one processor, causes the processor to perform steps including generating a network communication including a destination address associated with a second network device and a destination port number, wherein the destination port number corresponds to a service operating on the second network device. An initial SSL handshake protocol message is generated and at least the destination port number is inserted by the first network device into a SNI extension of the initial SSL handshake protocol message. An SSL connection is established with the second network device using a predetermined port number and the initial SSL handshake protocol message is sent to the second network device. Information included in the network communication is sent to the second network device using the SSL connection.

A first network device includes at least one of configurable hardware logic configured to implement or a processor configured to execute programmed instructions stored in a memory including generating a network communication including a destination address associated with a second network device and a destination port number, wherein the destination port number corresponds to a service operating on the second network device. An initial SSL handshake protocol message is generated and at least the destination port number is inserted by the first network device into a SNI extension of the initial SSL handshake protocol message. An SSL connection is established with the second network device using a predetermined port number and the initial SSL handshake protocol message is sent to the second network device. Information included in the network communication is sent to the second network device using the SSL connection.

A method for secure communication between network device services includes establishing at a second network device an SSL connection with a first network device and receiving at the second network device an initial SSL handshake protocol message from the first network device, wherein the initial SSL handshake protocol message includes a SNI extension including a destination port number. A service associated with the destination port number is identified with the second network device based on a first mapping of each of a plurality of port numbers to at least one service. A second mapping of one or more characteristics of the established SSL connection to one or more of the destination port number or the identified service is stored by the second network device. At least one network communication is obtained at the second network device from the first network device using the established SSL connection. The network communication is routed by the second network device to the identified service based on the second mapping.

A non-transitory computer readable medium having stored thereon instructions for secure communication between network device services comprising machine executable code which when executed by at least one processor, causes the processor to perform steps including establishing an SSL connection with a first network device and receiving an initial SSL handshake protocol message from the first network device, wherein the initial SSL handshake protocol message includes a SNI extension including a destination port number. A service associated with the destination port number is identified based on a first mapping of each of a plurality of port numbers to at least one service. A second mapping of one or more characteristics of the established SSL connection to one or more of the destination port number or the identified service is stored. At least one network communication is obtained from the first network device using the established SSL connection. The network communication is routed to the identified service based on the second mapping.

A second network device includes at least one of configurable hardware logic configured to implement or a processor configured to execute programmed instructions stored in a memory including establishing an SSL connection with a first network device and receiving an initial SSL handshake protocol message from the first network device, wherein the initial SSL handshake protocol message includes a SNI extension including a destination port number. A service associated with the destination port number is identified based on a first mapping of each of a plurality of port numbers to at least one service. A second mapping of one or more characteristics of the established SSL connection to one or more of the destination port number or the identified service is stored. At least one network communication is obtained from the first network device using the established SSL connection. The network communication is routed to the identified service based on the second mapping.

This technology provides a number of advantages including methods, non-transitory computer readable medium, and network devices that facilitate secure communication between network device services by including a port number associated with a destination service in an SNI field of an SSL message. With this technology, a predefined port number can be used for network communications between network devices, but the communications can still be routed to the appropriate destination services associated with various port numbers without being blocked by a firewall.

DETAILED DESCRIPTION

Figure 1:
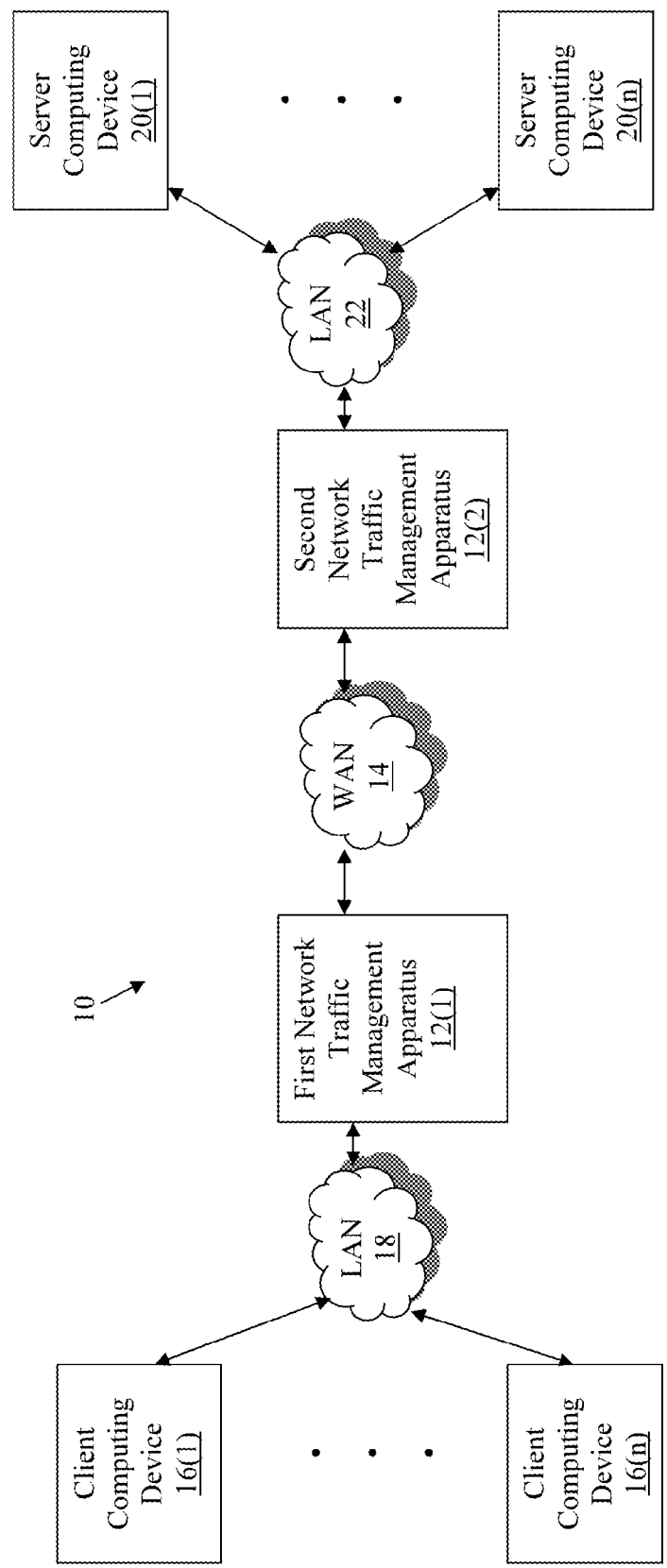
FIG. 1 is a block diagram of an exemplary network environment with a symmetric configuration of network traffic management apparatuses between client computing devices and servers.
Figure 2:
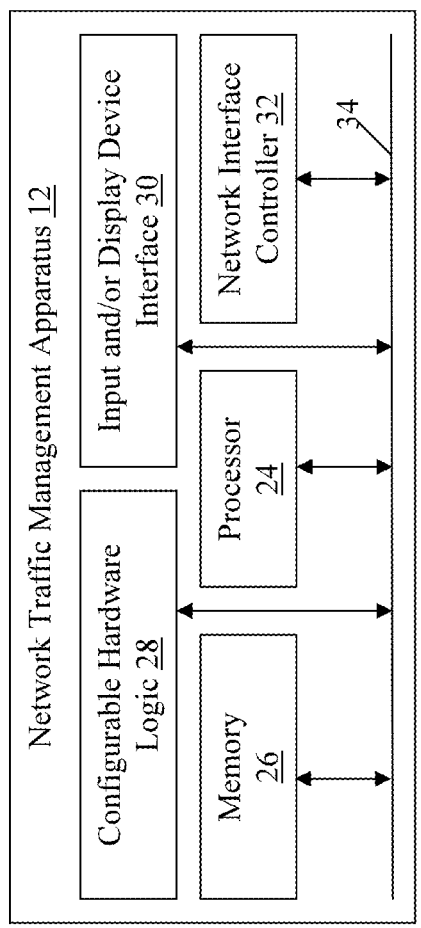
FIG. 2 is a block diagram of an exemplary network traffic management apparatus.

An exemplary network environment 10 with a symmetric configuration of network traffic management apparatuses 12(1) and 12(2) is illustrated in FIGS. 1 and 2. The exemplary network environment 10 includes the network traffic management apparatuses 12(1) and 12(2), client computing devices 16(1)-16(n), and server computing devices 20(1)-20(n) which are coupled together by a wide area network (WAN) 14 and/or a local area network (LAN) 18, although other types and numbers of systems, devices, components and other elements in other configurations which are coupled together in other manners can be used. This technology provides a number of advantages including methods, non-transitory computer readable medium, and network devices that facilitate secure communication between network device services by including a port number associated with a destination service in an SNI field of an SSL message.

Referring more specifically to FIGS. 1 and 2, the first network traffic management apparatus 12(1) is coupled to the second network traffic management apparatus 12(2) by the wide area network (WAN) 14. In this example, the first network traffic management apparatus 12(1) is further coupled to a plurality of client computing devices 16(1)-16(n) through a local area network (LAN) 18. Additionally, in this example, the second network traffic management apparatus 12(2) is coupled to a plurality of server computing devices 20(1)-20(n) through another LAN 22. Although network traffic management apparatus 12(1)-12(2) are shown in this example, other network devices configured to generate, send, and receive network communications can be used. Additionally, the network traffic management apparatus 12(1)-12(2) may be coupled together via other topologies. While not shown, the environment 10 also may include additional network components, such as routers, switches and other devices, which are well known to those of ordinary skill in the art and thus will not be described here.

Each of the network traffic management apparatus 12(1)-12(2) may perform optimizing, securing and accelerating the network traffic between the client computing devices 16(1)-16(n) and the server computing devices 20(1)-20(n), although other types and numbers of functions can be performed. Each network traffic management apparatus 12(1)-12(2) includes at least one processor 24, a memory 26, an optional configurable logic device 28, an input and/or display device interface 30, and a network interface controller 32 which are coupled together by a bus 34, although one or more of the network traffic management apparatus 12(1)-12(2) may comprise other types and numbers of elements in other configurations. In this example, the bus is a hyper-transport bus, although other bus types and communication links may be used, such as PCI.

The processor 24 of each network traffic management apparatus 12(1)-12(2) may execute one or more computer-executable programmed instructions stored in the memory 26 of each of the network traffic management apparatus 12(1)-12(2) for any number of the functions identified above for managing network traffic. The processor 24 of each network traffic management apparatus 12(1)-12(2) may comprise one or more central processing units (CPUs) or general purpose processors with one or more processing cores, such as AMD® processor(s), although other types of processor(s) could be used (e.g., Intel®).

The memory 26 of each of the network traffic management apparatus 12(1)-12(2) stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 24, can be used for the memory 26.

The optional configurable hardware logic 28 of each network traffic management apparatus 12(1)-12(2) may comprise specialized hardware configured to be capable of implement one or more steps of this technology as illustrated and described with reference to the examples herein. By way of example only, the optional configurable logic 28 may comprise one or more of field programmable gate arrays (FPGAs), field programmable logic devices (FPLDs), application specific integrated circuits (ASICs) and/or programmable logic units (PLUs).

The input and display device interface 30 of each network traffic management apparatus 12(1)-12(2) enables a user, such as an administrator, to interact with each of the network traffic management apparatus 12(1)-12(2), such as to input and/or view data and/or to configure, program and/or operate it by way of example only. Input devices configured to communicate with the input and/or display device interface 30 may include a keyboard and/or a computer mouse and display devices configured to communicate with the input and/or display device interface 30 may include a computer monitor, although other types and numbers of input devices and display devices could also be used.

The network interface controller 32 in each of the network traffic management apparatus 12(1)-12(2) operatively couples and communicates between each network traffic management apparatus 12(1)-12(n), the client computing devices 16(1)-16(n), and the server computing devices 20(1)-20(n), which are all coupled together by the LANs 18, 22 and WAN 14, although other types and numbers of communication networks or systems with other types and numbers of connections and configurations to other devices and elements. By way of example only, the LANs 18, 22 and WAN 14 can use TCP/IP over Ethernet and industry-standard protocols, including NFS, CIFS, SOAP, XML, LDAP, and SNMP, although other types and numbers of communication networks, can be used.

The LANs 18, 22 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN 14 may comprise any wide area network (e.g., Internet), although any other type of traffic network topology may be used.

Each of the client computing devices 16(1)-16(n) and each of the server computing devices 20(1)-20(n) include a central processing unit (CPU) or processor, a memory, an interface device, and an I/O system, which are coupled together by a bus or other link, although other numbers and types of network devices could be used. The client computing devices 16(1)-16(n) may run interface applications, such as Web browsers, that may provide an interface to make requests for and send content and/or data to applications or services provided by the server computing devices 20(1)-20(n) via the LANs 18, 22 and/or WAN 14 using the sending traffic management apparatus 12(1).

Generally, the server computing devices 20(1)-20(n) process requests received from requesting client computing devices 16(1)-16(n) via LANs 18, 22 and/or WAN 14 according to the HTTP-based application RFC protocol or the CIFS or NFS protocol for example. Various network processing applications, such as CIFS applications, NFS applications, HTTP Web Server computing device applications, and/or FTP applications, may be operating on the server computing devices 20(1)-20(n) and transmitting data (e.g., files, Web pages) to the second network traffic management apparatus 12(2) in response to requests from the client computing devices 16(1)-16(n).

The server computing devices 20(1)-20(n) may provide data or receive data in response to requests directed toward applications on the server computing devices 20(1)-20(n) from the client computing devices 16(1)-16(n). The server computing devices 20(1)-20(n) may be hardware or software or may represent a system with multiple server computing devices 20(1)-20(n) in a server pool, which may include internal or external networks. In this example the server computing devices 20(1)-20(n) may be any version of Microsoft® IIS server or Apache® server, although other types of server computing devices 20(1)-20(n) may be used. Further, additional server computing devices 20(1)-20(n) may be coupled to the LANs 22 and many different types of applications may be available on each of the server computing devices 20(1)-20(n).

Although an exemplary network environment 10 with the client computing devices 16(1)-16(n), network traffic management apparatus 12(1)-12(2), server computing devices 20(1)-20(n), LANs 18, 22 and WAN 14 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 3:
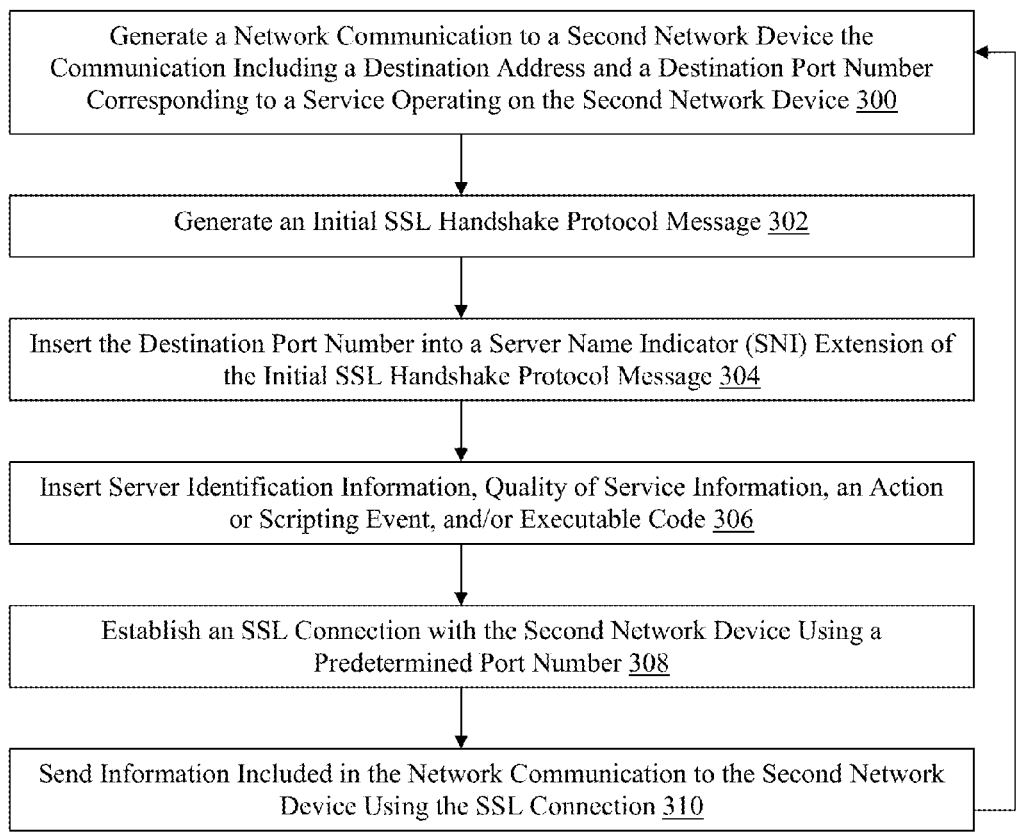
FIG. 3 is a flowchart of an exemplary method for sending secure communications to a service operating on another network device.

An exemplary method for facilitating secure communication between network device services will now be described with reference to FIGS. 1-4. Referring more specifically to FIG. 3, an exemplary method for sending secure communications to a service operating on another network device will now be described. In this example, in step 300, the first network traffic management apparatus 12(1) generates a network communication. The network communication can be generated by a service operating on the first network traffic management apparatus 12(1), for example, although the network communication can originate from other sources. The network communication can be in any network protocol format, such as transmission control protocol (TCP), for example.

In this example, the network communication includes at least a destination address associated with the second network traffic management apparatus 12(2) and a destination port number. The destination address can be an Internet protocol (IP) address of the second network traffic management apparatus 12(1) as stored in the memory 26 of the first network traffic management apparatus 12(1). The destination address can be stored in the memory 26 of the first network traffic management apparatus 12(1) by a manufacturer, network administrator, or by the first network traffic management apparatus 12(1) subsequent to a discovery process.

The destination port number can correspond to a service operating on the second network traffic management apparatus 12(2), for example. The service operating on the first network traffic management apparatus 12(1) and originating the network communication can determine the appropriate destination port number by referencing a table stored in the memory 26 of the first network traffic management apparatus 12(1) and configured to include a mapping of each of a plurality of port numbers to at least one service.

In step 302, the first network traffic management apparatus 12(1) generates an initial secure sockets layer (SSL) handshake protocol message. In one example, the network communication is communicated by the originating service operating on the first network traffic management apparatus 12(1) to a traffic management microkernel (TMM) operating on the first network traffic management apparatus 12(1). In this example, the TMM is configured to generate an initial SSL handshake protocol message, such as a ClientHello message. In other examples, a process other than a TMM or a hardware device of the first network traffic management apparatus can generate the initial SSL handshake protocol message. Other methods of generating the initial SSL handshake protocol message can also be used.

In step 304, the first network traffic management apparatus 12(1) modifies the initial SSL handshake protocol message generated in step 302 by inserting at least the destination port number into a server name indicator (SNI) extension of the initial SSL handshake protocol message. The TMM, or any other process or hardware device, of the first network traffic management apparatus 12(1) uses the SNI extension to communicate the destination port number generated in step 300 to the second network traffic management apparatus 12(2), as described and illustrated below with reference to steps 306-310.

Optionally, in step 306, the first network traffic management apparatus 12(1) further modifies the initial SSL handshake protocol message generated in step 302 by inserting into the SNI extension of the message identification information for one or more of the server computing devices 20(1)-20(n), quality of service information to be associated with the SSL connection, if successfully established, an action or scripting event to be performed by the second network traffic management apparatus 12(2), and/or executable code to be performed by the second network traffic management apparatus 12(2). In one example the first network traffic management apparatus 12(1) inserts a hypertext transfer protocol (HTTP) GET request into the SNI extension to allow the second network traffic management apparatus 12(2) to retrieve requested content prior to successfully establishing an SSL connection.

In step 308, the sending network traffic management 12(1) attempts to establish an SSL connection with the second network traffic management apparatus 12(2) using a predetermined port number. In this example, the first network traffic management apparatus 12(1) sends the modified initial SSL handshake protocol message to the second network traffic management apparatus 12(2). The predetermined port number is established by a manufacturer or network administrator, for example, and is stored in the memory 26 of the first network traffic management apparatus 12(1). In this example, the predetermined port number represents a port that has been made available on a network for communicating with the second network traffic management apparatus 12(2) coupled to the network. By using the predetermined port number to establish the SSL connection, the modified initial SSL handshake protocol message will not be filtered by any intermediary devices, such as a device providing a firewall, for example.

Additionally, each of the network traffic management apparatus 12(1)-12(2) can exchange certificates and/or keys, optionally signed, according to standard SSL protocol specifications. If the first network traffic management apparatus 12(1) is not authenticated or the SSL connection is otherwise not successfully established, then the first network traffic management apparatus 12(1) can retry the authentication process, attempt to send the network communication based on an insecure protocol such as TCP, or abandon the attempt to communicate the information, for example.

If the SSL connection is successfully established, in step 310, the first network traffic management apparatus 12(1) sends the network communication generated in step 300 to the second network traffic management apparatus 12(2) using the established SSL connection. Subsequent to sending the network communication, or at any time prior, the first network traffic management apparatus 12(1) can generate another network communication in step 300, as described and illustrated earlier.

Accordingly, in this example, the first network traffic management apparatus 12(1) can securely communicate information using SSL to the second network traffic management apparatus 12(2). A predetermined port number that will not result in the filtering of any network communications is advantageously used to establish the SSL connection. Additionally, an SNI extension of an initial SSL handshake protocol message is modified to communicate the destination port number associated with a service operating on the second network traffic management apparatus 12(2) that is the intended recipient of the network communication generated in step 300.

Figure 4:
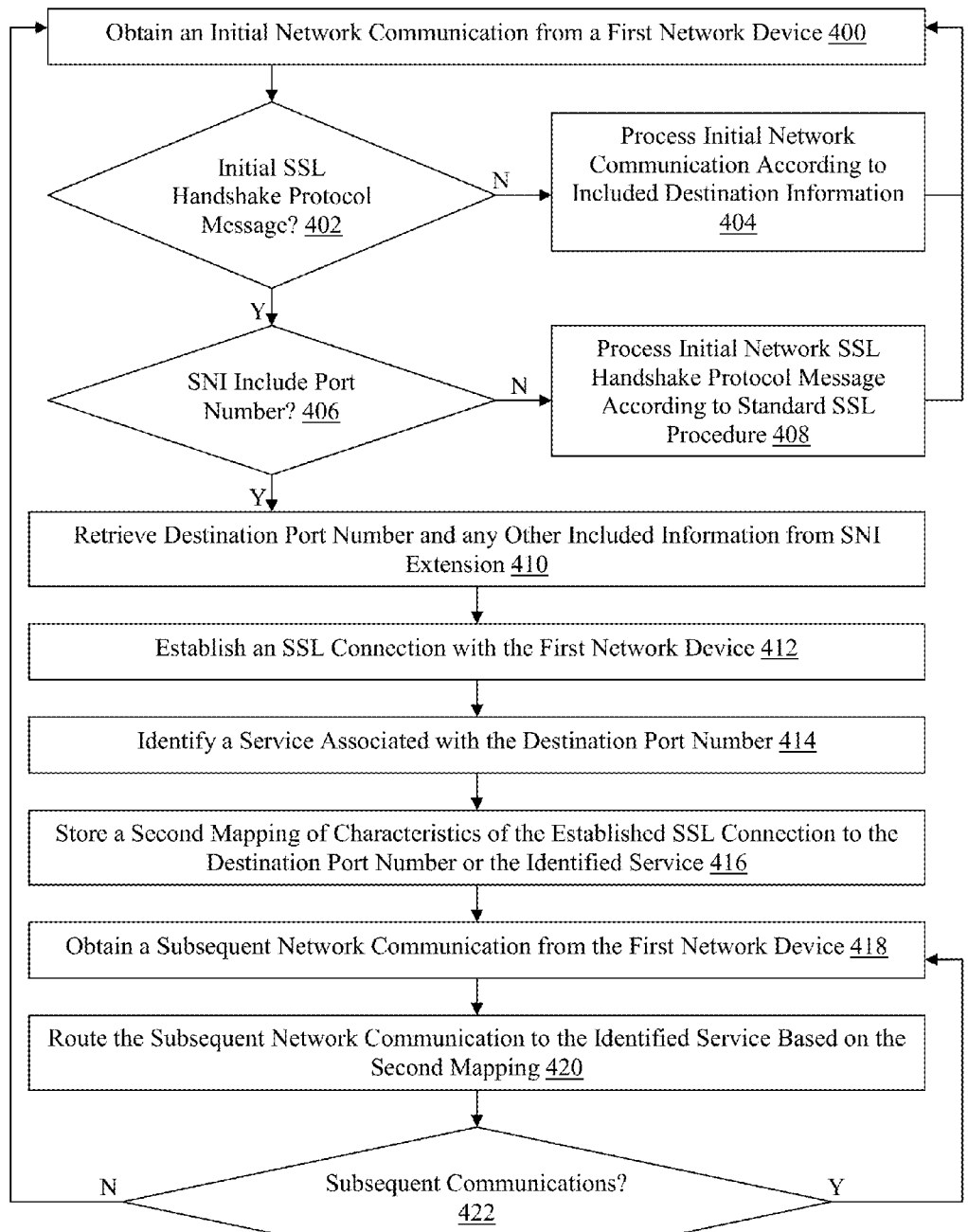
FIG. 4 is a flowchart of an exemplary method for receiving secure communications from another network device and routing the secure communications to a service.

Referring specifically to FIG. 4, an exemplary method for receiving secure communications from another network device and routing the secure communications to one of a plurality of services will now be described. In this example the second network device is the second network traffic management apparatus 12(2). In step 400, the second network traffic management apparatus 12(2) obtains an initial network communication from the first network traffic management apparatus 12(1), although the initial network communication can also be obtained by the second network traffic management apparatus 12(1) from another network device. In step 402, the second network traffic management apparatus 12(2) determines whether the initial network communication is an initial SSL handshake protocol message. If the second network traffic management apparatus 12(2) determines the initial network communication is not an initial SSL handshake protocol message, then the No branch is taken to step 404. In step 404, the second network traffic management apparatus 12(2) processes the initial network communication according to destination information included therein.

If the second network traffic management apparatus 12(2) determines the initial network communication is an initial SSL handshake protocol message, then the Yes branch is taken to step 406. In step 406, the second network traffic management apparatus 12(2) determines whether the initial SSL handshake protocol message includes a port number in an SNI extension. If the second network traffic management apparatus 12(2) determines the initial SSL handshake protocol message does not include an SNI extension including a destination port number, then the No branch is taken to step

408. In step 408, the second network traffic management apparatus 12(2) processes the initial SSL handshake protocol message according to standard SSL procedure.

If the second network traffic management apparatus 12(2) determines the initial SSL handshake protocol message does include an SNI extension including a destination port number, then the Yes branch is taken to step 410. In step 410, the second network traffic management apparatus 12(2) retrieves, and optionally at least temporarily stores, the destination port number from the SNI extension of the initial SSL handshake protocol message. In one example, a TMM operating on the second network traffic management apparatus 12(2) can process the initial SSL handshake protocol message to retrieve the destination port number included in the SNI extension.

Optionally, the second network traffic management apparatus 12(2) determines whether any other information is included in the SNI extension and retrieves the additional information. In some examples, the additional information includes identification information for one or more of the server computing devices 20(1)-20(n), quality of service information, information regarding an action to be performed by the second network device, or executable code to be performed. In examples in which an action to be performed is included in the SNI extension, the second network traffic management apparatus 12(2) can proceed directly, or subsequent to successfully establishing an SSL connection as described below, to execute the action.

In step 412, the second network traffic management apparatus 12(2) establishes an SSL connection with the first network traffic management apparatus 12(1). Optionally, the second network traffic management apparatus 12(2) authenticates the first network traffic management apparatus 12(1) using a trusted client list and/or public key infrastructure (PKI). Thereby, the second network traffic management apparatus 12(2) can restrict SSL connections to allowed network traffic management apparatus. If the second network traffic management apparatus 12(2) cannot authenticate the first network traffic management apparatus 12(1), or is not otherwise successful in establishing an SSL connection with the first network traffic management apparatus 12(1), the second network traffic management apparatus 12(2) can indicate the failure to the first network traffic management apparatus 12(1) and/or abandon the connection attempt.

In step 414, the second network traffic management apparatus 12(2) identifies a service associated with the destination port number retrieved in step 410. In this example, the second network traffic management apparatus 12(2) stores in the memory 26 a table including a first mapping of each of a plurality of port numbers to at least one service. The first mapping can be established by a manufacturer or network administrator. Optionally, the first mapping is equivalent to a table stored in the memory 26 of the first network traffic management apparatus 12(1) and used to determine the port number to include in the SNI extension of the initial SSL handshake protocol message. In this example, the second network traffic management apparatus 12(2) can use the first mapping to identify a service associated with the retrieved destination port number. Other methods of identifying a service associated with the destination port number can also be used.

Upon successfully establishing an SSL connection, in step 416, the second network traffic management apparatus 12(2) stores a second mapping of one or more characteristics of the established SSL connection to the destination port number and/or the identified service. In one example, a TMM operating on the second network traffic management apparatus 12(2) stores information regarding the established SSL connection, such as a session ID for example, as associated with the retrieved destination port number and/or information regarding the identified service associated with the destination port number. The second mapping can be included in the same or different table storing the first mapping in the memory 26 of the second network traffic management apparatus 12(2).

In step 418, the second network traffic management apparatus 12(2) obtains least one subsequent network communication from the first network traffic management apparatus 12(1) using the established SSL connection. In one example, the identified service is an rsync daemon and the subsequent network communication includes file synchronization data, although any other service can be used other data can be communicated. In step 420, the second network traffic management apparatus 12(2) routes the subsequent network communication to the identified service based on the second mapping.

In step 422, the second network traffic management apparatus 12(2) determines whether there are any additional subsequent network communications sent using the established SSL connection. If the second network traffic management apparatus 12(2) determines there is at least one additional subsequent communication, then the Yes branch is taken to step 418.

If the second network traffic management apparatus 12(2) determines there are no additional subsequent communications, then the No branch is taken to step 400. Optionally, the second network traffic management apparatus 12(2) closes the TCP connections associated with the established SSL connection subsequent to determining there are no additional subsequent communications. Also optionally, the SSL connection can be reused through a renegotiation process if the associated TCP connections have been closed. If an SSL connection is reused, the second mapping can be modified to reflect a different destination port number, if any, included in the SNI extension of a subsequent initial SSL handshake protocol message.

It should be appreciated that the second network traffic management apparatus 12(2) can continue to obtain network communications from a plurality of first network traffic management apparatus 12(1) and process them in parallel according to steps 402-422, as described and illustrated earlier. Additionally, the sending and second network traffic management apparatus 12(1)-12(2) can be receiving and first network traffic management apparatus, respectively, for one or more additional SSL connections. Further, the examples have been described and illustrated with reference to exemplary sending and second network traffic management apparatus 12(1)-12(2), although this technology is not limited to such devices.

With this technology, a first network device includes a destination port number associated with a service operating on a second network device in an SNI extension of an initial SSL handshake protocol message. The second network device establishes an SSL connection with the first network device and routes network communications sent using the SSL connection to the appropriate service based on the destination port number retrieved from the SNI extension. As a result, any number of SSL connections can be established between network devices using a predetermined and available port number and network communications sent using the SSL connections can be routed to a plurality of services associated with a plurality of port numbers. Accordingly, network devices can communicate information securely and to specified services operating on other network devices while mitigating the effects of potential packet filtering network devices limiting incoming traffic based on destination port number.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for secure communication between network device services, the method comprising:
   generating by a first network device a network communication including a destination address associated with a second network device and a destination port number, wherein the destination port number is restricted and corresponds to a service operating on the second network device;
   generating by the first network device an initial secure sockets layer (SSL) handshake protocol message, the generating comprising inserting at least the destination port number into a server name indicator (SNI) extension of the initial SSL handshake protocol message;
   establishing by the first network device an SSL connection with the second network device comprising sending the initial SSL handshake protocol message with the destination port number in the SNI extension to the second network device using a predetermined port number and the destination address, wherein the predetermined port number is different from the destination port number and is unrestricted; and
   sending by the first network device information included in the network communication to the service operating on the second network device and corresponding to the destination port number using the SSL connection.

2. The method as set forth in claim 1 wherein the network communication is generated by a service operating on the first network device, the services are daemons, and the first and second network devices are network traffic management apparatus.

3. The method as set forth in claim 1 further comprising inserting by the first network device, into the SNI extension, at least one of server identification information, quality of service information, an action to be performed by the second network device, or executable code to be performed by the second network device.

4. A non-transitory computer readable medium having stored thereon instructions for secure communication between network device services comprising machine executable code which when executed by at least one processor, causes the processor to perform steps comprising:
   generating a network communication including a destination address associated with a second network device and a destination port number, wherein the destination port number is restricted and corresponds to a service operating on the second network device;
   generating an initial secure sockets layer (SSL) handshake protocol message, the generating comprising inserting at least the destination port number into a server name indicator (SNI) extension of the initial SSL handshake protocol message;
   establishing an SSL connection with the second network device comprising sending the initial SSL handshake protocol message with the destination port number in the SNI extension to the second network device using a predetermined port number and the destination address, wherein the predetermined port number is different from the destination port number and is unrestricted; and
   sending information included in the network communication to the service operating on the second network device and corresponding to the destination port number using the SSL connection.

5. The non-transitory computer readable medium as set forth in claim 4 wherein the network communication is generated by a service, the services are daemons, and the second network device is a network traffic management apparatus.

6. The non-transitory computer readable medium as set forth in claim 4 wherein the executable code when executed by the processor further causes the processor to perform at least one additional step comprising inserting into the SNI extension at least one of server identification information, quality of service information, an action to be performed by the second network device, or executable code to be performed by the second network device.

7. A first network device, comprising:
   a processor and a memory coupled to the processor which is configured to be capable of executing programmed instructions comprising and stored in the memory to:
      generate a network communication including a destination address associated with a second network device and a destination port number, wherein the destination port number is restricted and corresponds to a service operating on the second network device;
      generate an initial secure sockets layer (SSL) handshake protocol message, the generating comprising inserting at least the destination port number into a server name indicator (SNI) extension of the initial SSL handshake protocol message;
      establish an SSL connection with the second network device comprising sending the initial SSL handshake protocol message with the destination port number in the SNI extension to the second network device using a predetermined port number and the destination address, wherein the predetermined port number is different from the destination port number and is unrestricted; and
      send information included in the network communication to the service operating on the second network device and corresponding to the destination port number using the SSL connection.

8. The first network device as set forth in claim 7 wherein the network communication is generated by a service, the services are daemons, and the second network device is a network traffic management apparatus.

9. The first network device as set forth in claim 7 wherein the processor coupled to the memory is further configured to be capable of executing at least one additional programmed instruction comprising and stored in the memory to insert into the SNI extension at least one of server identification information, quality of service information, an action to be performed by the second network device, or executable code to be performed by the second network device.

10. The method as set forth in claim 1 wherein the predetermined port number is established, prior to establishing the SSL connection, as unrestricted by a firewall disposed proximate the second network device.

11. The method as set forth in claim 1 wherein the destination port number is restricted by a firewall disposed proximate the second network device.

12. The non-transitory computer readable medium as set forth in claim 4 wherein the predetermined port number is established, prior to establishing the SSL connection, as unrestricted by a firewall disposed proximate the second network device.

13. The non-transitory computer readable medium as set forth in claim 4 wherein the destination port number is restricted by a firewall disposed proximate the second network device.

14. The first network device as set forth in claim 7 wherein the predetermined port number is established, prior to establishing the SSL connection, as unrestricted by a firewall disposed proximate the second network device.

15. The first network device as set forth in claim 7 wherein the destination port number is restricted by a firewall disposed proximate the second network device.

\* \* \* \* \*